United States Patent

Janecke

[11] Patent Number: 6,113,516
[45] Date of Patent: Sep. 5, 2000

[54] ADAPTIVE AUTOMATED TRANSMISSION UPSHIFT CONTROL

[75] Inventor: Daniel P. Janecke, Kalamazoo, Mich.

[73] Assignee: Eaton Corporation, Cleveland, Ohio

[21] Appl. No.: 09/356,568

[22] Filed: Jul. 19, 1999

Related U.S. Application Data

[63] Continuation-in-part of application No. 09/232,252, Jan. 14, 1999.

[51] Int. Cl.⁷ .............................. F16H 59/30; F16H 59/00
[52] U.S. Cl. ................................. 477/124; 74/335
[58] Field of Search ............................ 74/335, 336 R; 477/123, 124

[56] References Cited

U.S. PATENT DOCUMENTS

| | | | |
|---|---|---|---|
| 4,361,060 | 11/1982 | Smyth | 74/866 |
| 4,595,986 | 6/1986 | Daubenspeck et al. | 364/424.1 |
| 4,648,290 | 3/1987 | Dunkley et al. | 477/78 |
| 4,850,236 | 7/1989 | Braun | 74/337 |
| 4,947,331 | 8/1990 | Speranza | 364/424.1 |
| 5,172,609 | 12/1992 | Nitz et al. | 74/866 |
| 5,219,391 | 6/1993 | Edelen et al. | 74/335 |
| 5,272,939 | 12/1993 | Markyvech | 74/866 |
| 5,335,566 | 8/1994 | Genise | 74/335 |
| 5,389,053 | 2/1995 | Steeby et al. | 477/123 |
| 5,390,561 | 2/1995 | Stine | 74/331 |
| 5,409,432 | 4/1995 | Steeby | 477/71 |
| 5,425,284 | 6/1995 | Davis | 74/335 |
| 5,425,689 | 6/1995 | Genise | 477/120 |
| 5,435,212 | 7/1995 | Menig | 74/745 |
| 5,479,345 | 12/1995 | Amsallen | 364/424.1 |
| 5,487,004 | 1/1996 | Amsallen | 364/424.1 |
| 5,489,247 | 2/1996 | Markyvech | 477/120 |
| 5,490,063 | 2/1996 | Genise | 364/424.1 |
| 5,509,867 | 4/1996 | Genise | 477/120 |
| 5,533,946 | 7/1996 | Markyvech | 477/78 |
| 5,582,069 | 12/1996 | Genise | 74/335 |
| 5,582,558 | 12/1996 | Palmeri et al. | 477/109 |
| 5,620,392 | 4/1997 | Genise | 477/120 |
| 5,655,407 | 8/1997 | Dresden et al. | 74/336 |
| 5,713,445 | 2/1998 | Davis et al. | 192/35 |
| 5,737,978 | 4/1998 | Stine | 74/606 |
| 5,743,143 | 4/1998 | Carpenter et al. | 74/335 |
| 5,766,111 | 6/1998 | Steeby et al. | 477/124 |
| 5,974,906 | 11/1999 | Stine et al. | 74/335 |

*Primary Examiner*—Charles A. Marmor
*Assistant Examiner*—Roger Pang
*Attorney, Agent, or Firm*—Howard D. Gordon

[57] ABSTRACT

A method/system for controlling upshifting in an automated mechanical transmission system (10) utilized on a vehicle. When an upshift from a currently engaged ratio (GR) is required ($ES>ES_{U/S}$), skip upshifts ($GR_{TARGET}=GR+N$, $N>1$) and then single upshifts ($GR_{TARGET}=GR+1$) are evaluated in sequence. If throttle demand is high (THL>REF), to encourage performance-oriented selection of ratios, skip upshifts are evaluated to determine if they can be completed at a higher engine speed ($ES_{MIN}=ES_{DEFAULT}+\text{offset}$) than is otherwise required.

24 Claims, 4 Drawing Sheets

ADAPTIVE AUTOMATED TRANSMISSION UPSHIFT CONTROL

RELATED APPLICATIONS

This application is a continuation-in-part of copending U.S. Ser. No. 09/232,252 titled AUTOMATED TRANSMISSION UPSHIFT CONTROL filed Jan. 14, 1999, and assigned to EATON CORPORATION, assignee of this application.

This application is related to copending U.S. Ser. No. 09/356,744 titled ADAPTIVE AUTOMATED TRANSMISSION DOWNSHIFT CONTROL filed Jul. 19, 1999, and assigned to EATON CORPORATION, assignee of this application.

BACKGROUND OF THE INVENTION

1. Field of the Invention

The present invention relates to a control method/system for controlling upshifting in an at least partially automated mechanical transmission system. In particular, the present invention relates to the control of upshifting in a vehicular automated mechanical transmission system wherein the system senses conditions indicative of an upshift from a currently engaged gear ratio (GR) and evaluates, in sequence, the desirability of skip upshifts and then single upshifts and commands upshifts deemed desirable. More particularly, the present invention will sense conditions indicative of an operator's desire for performance and will modify the criteria for evaluating possible skip upshifts accordingly.

2. Description of the Prior Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639.

Controls for automated mechanical transmission systems, especially wherein shifting is accomplished while maintaining the master clutch engaged and/or wherein single and/or skip shift feasibility is evaluated are known in the prior art, as may be seen by reference to U.S. Pat. Nos. 4,576,065; 4,916,979; 5,335,566; 5,425,689; 5,272,939; 5,479,345; 5,533,946; 5,582,069; 5,620,392; 5,489,247; 5,490,063 and 5,509,867, the disclosures of which are incorporated herein by reference.

SUMMARY OF THE INVENTION

The control of the present invention provides a control for a vehicular automated mechanical transmission system which will sense conditions indicative of upshifting from a currently engaged gear ratio, and will evaluate, in sequence, the desirability of large skip upshifts, then single skip upshifts, and then single upshifts, and will command an upshift to the first target ratio deemed to be desirable under current vehicle operating conditions.

The foregoing is accomplished, in a preferred embodiment of the present invention, by setting (i) a maximum acceptable shift time for completing upshifts and (ii) upshift feasibility rules to determine if a proposed upshift is feasible under current vehicle operating conditions. The upshift feasibility rules comprise a two-part test, (a) can the upshift be completed above a minimum engine speed? and (b) when completed, will the engine, in the target ratio, provide sufficient torque at the drive wheels to allow at least a minimum vehicle acceleration?

Large skip upshifts (i.e., upshifts from GR to GR+3) and then single skip upshifts (i.e., upshifts to GR+2) are evaluated to determine if (i) they can be completed within the maximum acceptable shift time and (ii) if they are feasible. If the evaluated skip upshift meets both tests, it is desirable and is commanded. If a skip shift is not desirable, a single upshift (i.e., upshifts to GR+1) is evaluated for feasibility (only) and commanded if feasible.

If operation in a performance mode is sensed, usually if throttle position is relatively high (such as, for example, 85% or higher), the minimum engine speed for synchronizing possible skip upshifts is increased, forcing more performance-oriented gear selection.

Accordingly, an improved upshift control for automated mechanical transmissions is provided which, if performance operation is required, will automatically evaluate and command desirable skip upshifts on a criteria tending to force selection of performance-oriented gear ratios.

This and other objects and advantages of the present invention will become apparent from a reading of the following description of the preferred embodiment taken in connection with the attached drawings.

DESCRIPTION OF THE PREFERRED EMBODIMENT

Figure 1:
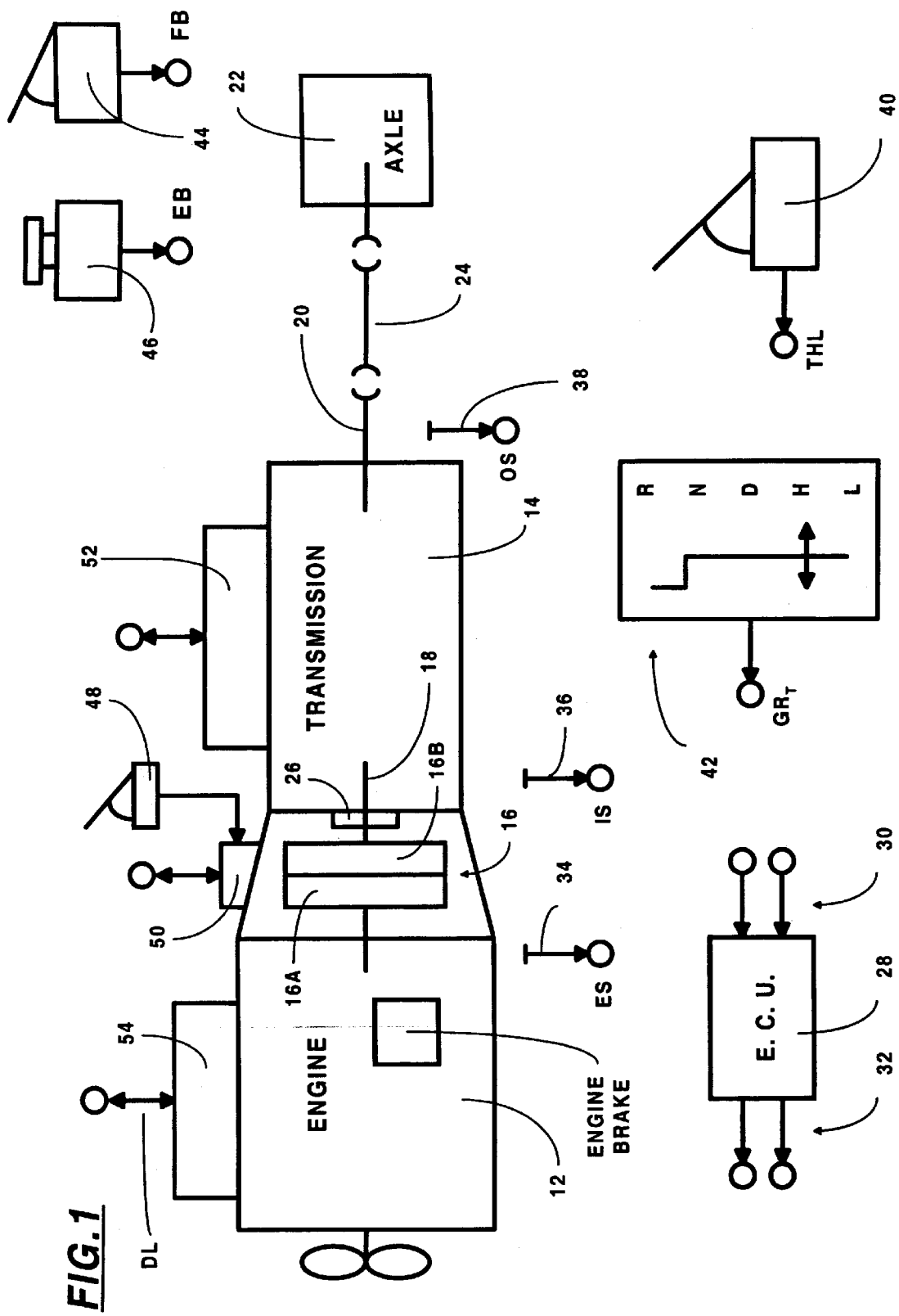
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmissions of this type, especially as used with heavy-duty vehicles, typically have 6, 7, 8, 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal (GRτ) indicative thereof.

As is known, if the clutch is engaged, the rotational speed of the engine may be determined from the speed of the input shaft and/or the speed of the output shaft and the engaged transmission ratio (ES=IS=OS*GR).

System 10 also may include sensors 44 and 46 for sensing operation of the vehicle foot brake (also called service brakes) and engine brakes, respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. In the preferred embodiment, the clutch is manually controlled and used only to launch the vehicle (see U.S. Pat. Nos. 4,850, 236; 5,272,939 and 5,425,689). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391. Actuator 52 may shift the main and/or auxiliary section of transmission 14. The engaged and disengaged condition of clutch 16 may be sensed by a position sensor (not shown) or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

As is known, for automated shifting, the ECU 28 must determine when upshifts and downshifts are required and if a single or skip shift is desirable (see U.S. Pat. Nos. 4,361,060; 4,576,065; 4,916,979 and 4,947,331).

Figure 2:
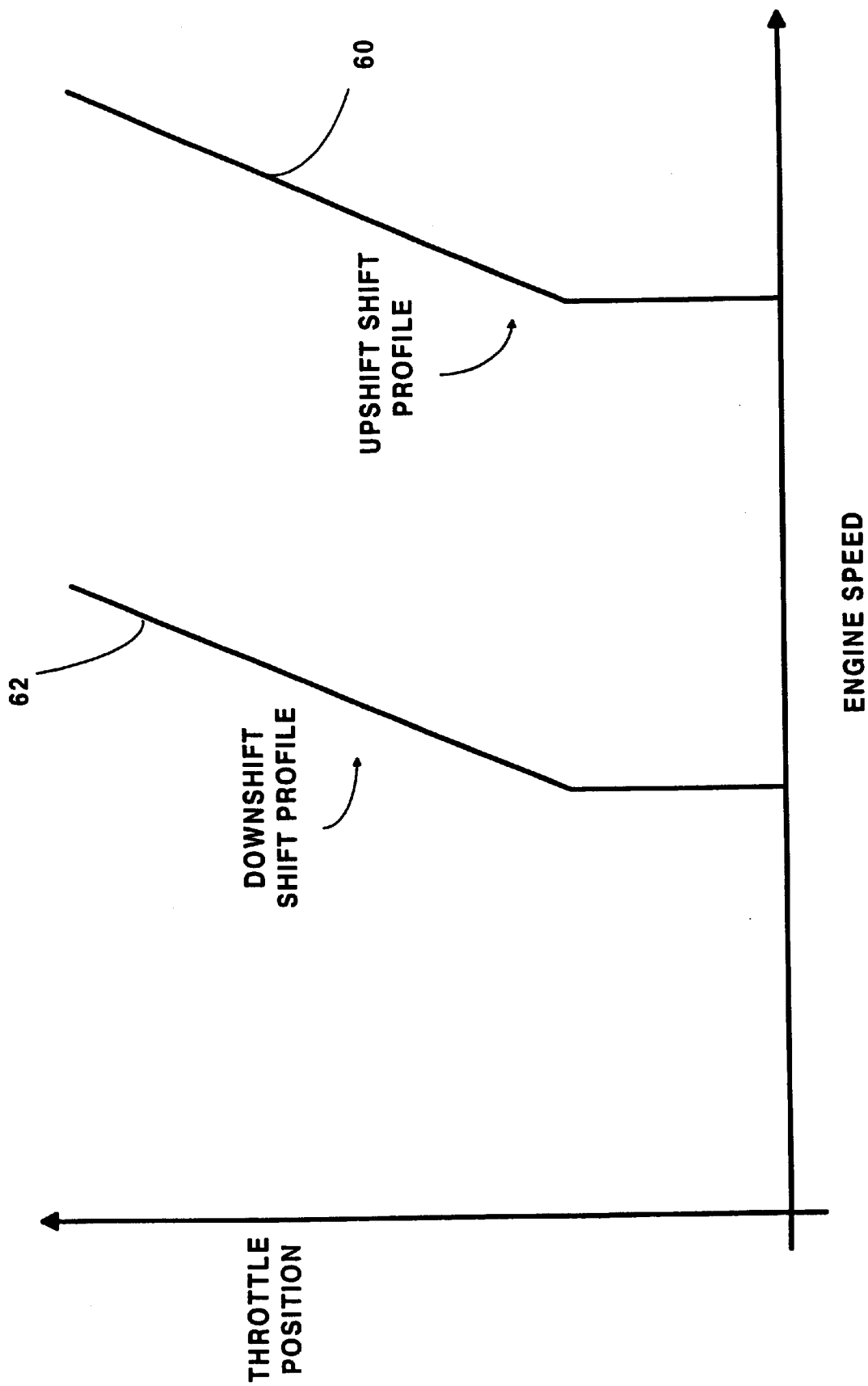
FIG. 2 is a schematic illustration, in graphical format, illustrating shift point profiles for the transmission system of FIG. 1 according to the present invention.

FIG. 2 is a graphical representation of shift point profiles utilized to determine when shift commands should be issued by the ECU 28 to the shift actuator 52. Solid line 60 is the default upshift profile, while solid line 62 is the default downshift profile. As is known, if the vehicle is operating to the right of upshift profile 60, an upshift of transmission 14 should be commanded, while if the vehicle is operating to the left of downshift profile 62, a downshift should be commanded. If the vehicle is operating in between profiles 60 and 62, no shifting of the transmission is then required.

Shift profile 60 is a graphical representation of the engine speeds at which upshifts from a currently engaged ratio (GR) are indicated (ESU/S) for various degrees of throttle displacement (ie., demand).

According to the control of a preferred embodiment of the present invention, if an upshift from a currently engaged ratio (GR) is required (i.e., if at current throttle displacement engine speed (ES) is greater than the upshift engine speed (ESU/S) on shift point profile 60), a sequence is initiated for identifying the desirable upshift target ratio (GRTARGET), if any. The control, in sequence, will evaluate skip and then single upshifts for desirability and command an upshift to the first potential target ratio deemed desirable.

A maximum time for completion of an upshift is established based upon considerations for shift quality, vehicle performance, etc. For heavy-duty trucks, by way of example, this time value may have a value of about 1.0 to 2.0 seconds.

A two-part feasibility test is established:

(1) Will the engine speed be at a synchronous value above a preselected minimum engine speed ESMIN, given current/assumed engine and vehicle deceleration rates? The ESMIN, by way of example, has a default value selected at about 1100 to 1300 rpm, which for a typical heavy-duty diesel engine is at or near a peak torque rpm. The engine deceleration rate may be evaluated with or without the use of engine braking. This logic may be appreciated by reference by U.S. Pat. Nos. 5,335,566 and 5,425,689, the disclosures of which are incorporated herein by reference. Use of engine brakes (also called exhaust and Jake brakes) to enhance upshifting is known, as may be seen by reference to U.S. Pat. No. 5,409,432; and (2) At completion of a proposed upshift, will torque at the drive wheels provide sufficient torque for at least minimal vehicle acceleration? (See U.S. Pat. Nos. 5,272,939 and 5,479,345, the disclosures of which are incorporated herein by reference.

If one or both of these parts of the feasibility test are not satisfied, the upshift to an evaluated target ratio (GR+1, 2, 3, . . . ) is not feasible and will not be commanded.

According to the logic of the present invention, upon sensing that an upshift is indicated (ES>ESU/S), in sequence:

(1) A big skip upshift from the currently engaged ratio GR to GR+3 (without using engine brakes) is evaluated and if an upshift to GR+3 is (i) feasible and (ii) can be accomplished within the maximum time, it is desirable and an upshift to GR+3 will be initiated. If not, (2) Then a single skip upshift to GR+2 (without using engine brakes) is evaluated and if an upshift to GR+2 is (i) feasible and (ii) can be accomplished within the maximum time, it is desirable and an upshift to GR+2 will be initiated. If not, (3) Then a single upshift to GR+1 (without using engine brakes) is evaluated and if an upshift to GR+1 (without using engine brakes) is feasible, an upshift to GR+1 (without using engines brakes) will be commanded. If not, (4) Then a single upshift to GR+1 using the engine brake is evaluated and if an upshift to GR+1 using the engine brake is feasible, an upshift to GR+1 using the engine brake will be commanded. If not, (5) No upshift will be initiated.

To provide for enhanced performance when performance is requested by the operator, such as, for example, when the throttle pedal is above a reference value (usually about 85–90%), the minimum engine speed used to evaluate skip upshifts is increased by a performance offset (i.e., $ES_{MIN}=ES_{DEFAULT}+$performance offset). For a typical diesel engine having a governed speed of about 2100 RPM, the offset is equal to about 50–150 RPM. By increasing the value of the minimum engine speed used to evaluate skip (but not single) upshifts, a more performance-oriented gear selection is forced.

Alternatively, the value of the minimum engine speed used to evaluate skip upshifts could be increased from the default value to a fully offset value thereof in several increments, or continuously, as throttle position exceeds a reference value.

Figure 3A:
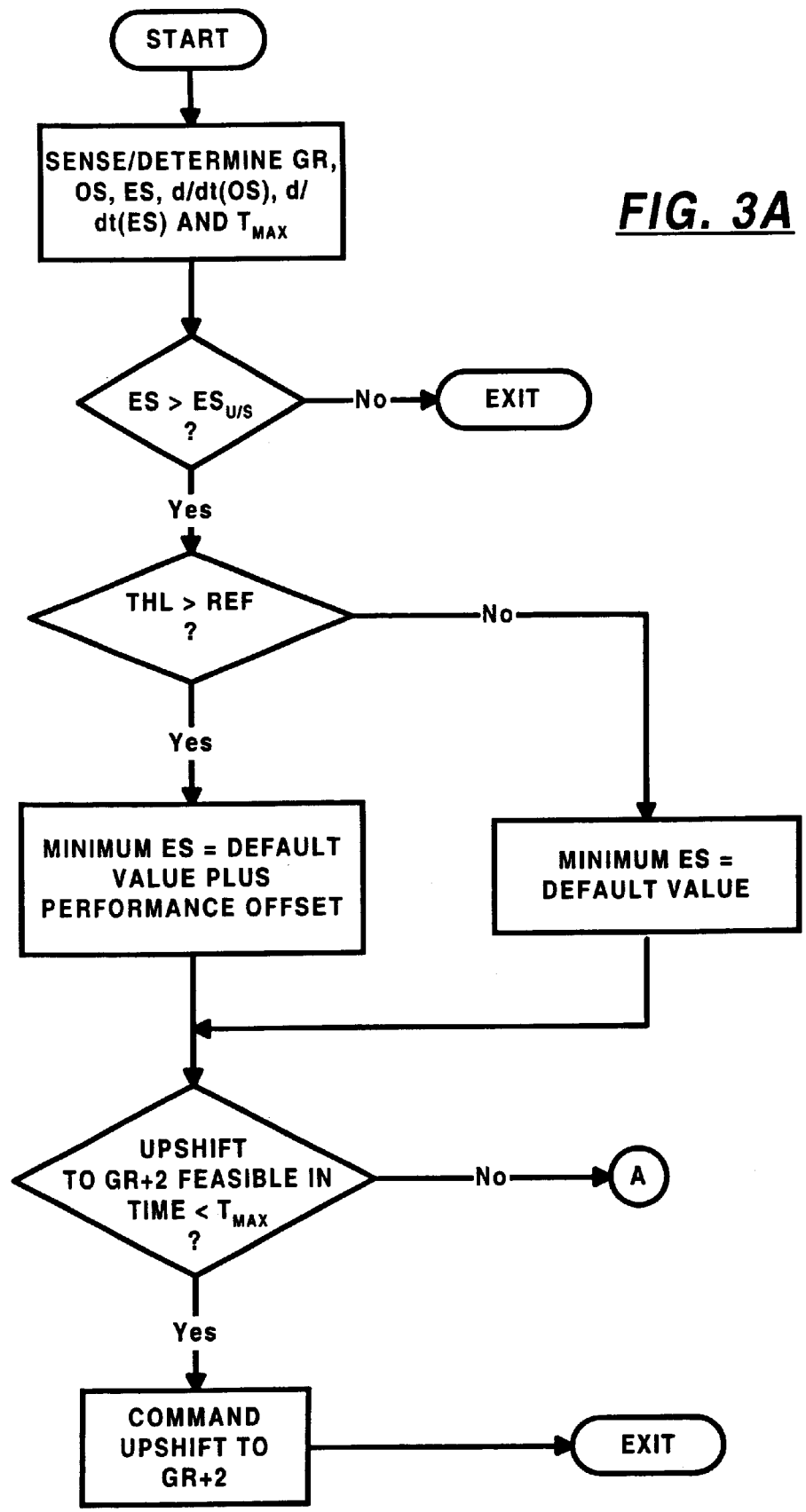
FIGS. 3A and 3B are schematic illustrations, in flow chart format, of the control of the present invention.
Figure 3B:
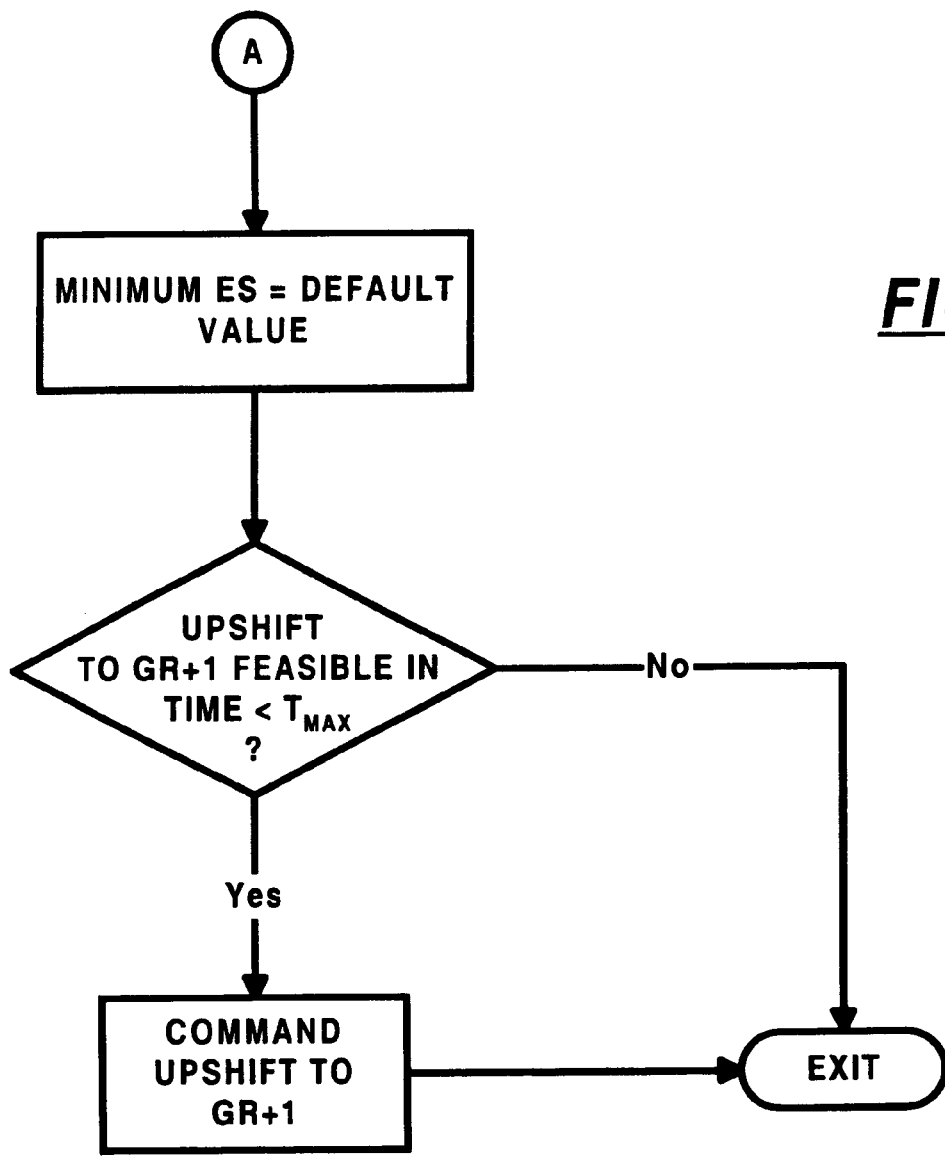

The control of the present invention is shown in flow chart format in FIGS. 3A and 3B. The control logic of the present invention will cause upshifts to the gear ratio, resulting in an engine speed close to, but not less than, a calibrated value, $ES_{MIN}$, which, at the default value, is at or near the peak torque rotational speed of the engine and, at the default plus offset value, is at or near the peak power speed of the engine. Although only single skip shifts are illustrated in FIGS. 3A and 3B, the present invention also is applicable to skip shifts of two or three or more ratios.

In one alternative embodiment of the present invention, if evaluated skip upshifts (without using engine brakes) are found not to be feasible, then the same upshift may be evaluated and commanded using the engine brakes.

Accordingly, it may be seen that an improved control system/method for controlling upshifting in an at least partially automated mechanical transmission system is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling automatic upshifting in a vehicular automated mechanical transmission system (10) for a vehicle comprising a fuel-controlled engine (12), a multiple-speed mechanical transmission (14), and a controller (28) for receiving input signals (30) including one or more of signals indicative of engine speed (ES), engaged gear ratio (GR) and vehicle speed (OS), and to process said input signals in accordance with logic rules to issue command output signals (32) to transmission system actuators including a transmission actuator (52) effective to shift said transmission, said method including establishing an upshift feasibility criteria whereby upshifts into a target gear ratio are considered feasible only if, under sensed vehicle operating conditions, substantial synchronization can be achieved above a predetermined engine speed ($ES_{MIN}$); said method characterized by:

(i) sensing throttle position (THL);
   (ii) comparing throttle position to a performance reference value (REF);
   (iii) if at least one of (a) considering the feasibility of a single upshift or (b) if throttle position is less than said performance reference value, causing said engine speed to equal a default value ($ES_{MIN}=ES_{DEFAULT}$); and
   (iv) if (a) considering the feasibility of skip upshifts and (b) throttle position exceeds said performance reference value, causing said engine speed to equal the sum of an offset value plus a default value ($ES_{MIN}=ES_{DEFAULT}+$offset).

2. The method of claim 1 wherein said performance reference value is about 80–90% of full throttle displacement.

3. The method of claim 1 wherein said offset is about 50–150 RPM.

4. The method of claim 2 wherein said offset is about 50–150 RPM.

5. The method of claim 1 wherein said engine is a diesel engine, said default value is about 1200 RPM, and said offset is about 100 RPM.

6. The method of claim 2 wherein said engine is a diesel engine, said default value is about 1200 RPM, and said offset is about 100 RPM.

7. A method for controlling automatic upshifting in a vehicular automated mechanical transmission system (10) for a vehicle comprising a fuel-controlled engine (12), a multiple-speed mechanical transmission (14), and a controller (28) for receiving input signals (30) including one or more of signals indicative of throttle position (THL), engine speed (ES), engaged gear ratio (GR) and vehicle speed (OS), and to process said input signals in accordance with with logic rules to issue command output signals (32) to transmission system actuators including a transmission actuator (52) effective to shift said transmission, said method including:

(i) establishing a maximum acceptable time ($T_{MAX}$) for completion of skip upshifts;
   (ii) establishing an upshift feasibility criteria whereby upshifts into a target gear ratio are considered feasible only if, under sensed vehicle operating conditions,
      (a) substantial synchronization can be obtained above a predetermined engine speed and
      (b) at engagement of the target ratio, the vehicle will be capable of at least a predetermined acceleration (dOS/dt);
   (iii) upon sensing a requirement ($ES>ES/U/S$) for an upshift from an engaged gear ratio (GR), in sequence:
      (a) determining if a skip upshift of two ratios from the currently engaged ratio ($GR_{TARGET}=GR+2$) is feasible within a time no greater than said maximum acceptable time and, if so, commanding a skip upshift of two ratios from the currently engaged ratio; if not,
      (b) then determining if a single upshift ($GR_{TARGET}=GR+1$) is feasible and, if feasible, commanding a single upshift from the currently engaged ratio; said method characterized by:
   (i) sensing throttle position (THL);
   (ii) comparing throttle position to a performance reference value (REF);
   (iii) if at least one of (a) considering the feasibility of a single upshift or (b) if throttle position is less than said performance reference value, causing said engine speed to equal a default value ($ES_{MIN}=ES_{DEFAULT}$); and
   (iv) if (a) considering the feasibility of skip upshifts and (b) throttle position exceeds said performance reference value, causing said engine speed to equal the sum of an offset value plus a default value ($ES_{MIN}=ES_{DEFAULT}+$offset).

8. The method of claim 1 wherein said performance reference value is about 80–90% of full throttle displacement.

9. The method of claim 1 wherein said offset is about 50–150 RPM.

10. The method of claim 2 wherein said offset is about 50–150 RPM.

11. The method of claim 1 wherein said engine is a diesel engine, said default value is about 1200 RPM, and said offset is about 100 RPM.

12. The method of claim 2 wherein said engine is a diesel engine, said default value is about 1200 RPM, and said offset is about 100 RPM.

13. The method of claim 1 wherein said offset has a fixed value.

14. A control system for controlling automatic upshifting in a vehicular automated mechanical transmission system (10) for a vehicle comprising a fuel-controlled engine (12), a multiple-speed mechanical transmission (14), and a controller (28) for receiving input signals (30) including one or more of signals indicative of throttle position (THL), engine speed (ES), engaged gear ratio (GR) and vehicle speed (OS), and to process said input signals in accordance with with logic rules to issue command output signals (32) to transmission system actuators including a transmission actuator (52) effective to shift said transmission, said control system including logic rules for establishing an upshift feasibility criteria whereby upshifts into a target gear ratio are considered feasible only if, under sensed vehicle operating conditions, substantial synchronization can be achieved above a predetermined engine speed (ESMIN), said control system characterized by said logic rules being effective, for
  (i) sensing throttle position (THL);
  (ii) comparing throttle position to a performance reference value (REF);
  (iii) if considering the feasibility of a single upshift or if throttle position is less than said performance reference value, causing said engine speed to equal a default value (ESMIN=ESDEFAULT); and
  (iv) if (a) considering the feasibility of skip upshifts and (b) throttle position exceeds said performance reference value, causing said engine speed to equal the sum of an offset value plus a default value (ESMIN=ESDEFAULT+offset).

15. The system of claim 14 wherein said performance reference value is about 80–90% of full throttle displacement.

16. The system of claim 14 wherein said offset is about 50–150 RPM.

17. The system of claim 15 wherein said offset is about 50–150 RPM.

18. The system of claim 14 wherein said engine is a diesel engine, said default value is about 1200 RPM, and said offset is about 100 RPM.

19. The system of claim 15 wherein said engine is a diesel engine, said default value is about 1200 RPM, and said offset is about 100 RPM.

20. The system of claim 16 wherein said engine has a maximum torque rotational speed, said default engine speed (ESDEFAULT) substantially equal to said maximum torque rotational speed.

21. The system of claim 16 wherein said offset has a fixed value.

22. A method for controlling automatic upshifting in a vehicular automated mechanical transmission system (10) for a vehicle comprising a fuel-controlled engine (12), a multiple-speed mechanical transmission (14), and a controller (28) for receiving input signals (30) including one or more of signals indicative of engine speed (ES), engaged gear ratio (GR) and vehicle speed (OS), and to process said input signals in accordance with with logic rules to issue command output signals (32) to transmission system actuators including a transmission actuator (52) effective to shift said transmission, said method including establishing an upshift feasibility criteria whereby upshifts into a target gear ratio are considered feasible only if, under sensed vehicle operating conditions, substantial synchronization can be achieved above a predetermined engine speed (ESMIN); said method characterized by:
  (i) sensing throttle position (THL);
  (ii) comparing throttle position to a performance reference value (REF);
  (iii) if at least one of (a) considering the feasibility of a single upshift or (b) if throttle position is less than said performance reference value, causing said engine speed to equal a default value (ESMIN=ESDEFAULT); and
  (iv) if (a) considering the feasibility of skip upshifts and (b) throttle position exceeds said performance reference value, causing said engine speed to equal the sum of an offset value variable with throttle position plus said default value (ESMIN=ESDEFAULT+offset).

23. A method for controlling automatic upshifting in a vehicular automated mechanical transmission system (10) for a vehicle comprising a fuel-controlled engine (12), a multiple-speed mechanical transmission (14), and a controller (28) for receiving input signals (30) including one or more of signals indicative of throttle position (THL), engine speed (ES), engaged gear ratio (GR) and vehicle speed (OS), and to process said input signals in accordance with with logic rules to issue command output signals (32) to transmission system actuators including a transmission actuator (52) effective to shift said transmission, said method including:
  (i) establishing a maximum acceptable time (TMAX) for completion of skip upshifts;
  (ii) establishing an upshift feasibility criteria whereby upshifts into a target gear ratio are considered feasible only if, under sensed vehicle operating conditions,
    (a) substantial synchronization can be obtained above a predetermined engine speed and
    (b) at engagement of the target ratio, the vehicle will be capable of at least a predetermined acceleration (dOS/dt);
  (iii) upon sensing a requirement (ES>ES/U/S) for an upshift from an engaged gear ratio (GR), in sequence:
    (a) determining if a skip upshift of two ratios from the currently engaged ratio (GRTARGET=GR+2) is feasible within a time no greater than said maximum acceptable time and, if so, commanding a skip upshift of two ratios from the currently engaged ratio; if not,
    (b) then determining if a single upshift (GRTARGET=GR+1) is feasible and, if feasible, commanding a single upshift from the currently engaged ratio; said method characterized by:
  (i) sensing throttle position (THL);
  (ii) comparing throttle position to a performance reference value (REF);
  (iii) if at least one of (a) considering the feasibility of a single upshift or (b) if throttle position is less than said performance reference value, causing said engine speed to equal a default value (ESMIN=ESDEFAULT); and
  (iv) if (a) considering the feasibility of skip upshifts and (b) throttle position exceeds said performance reference value, causing said engine speed to equal the sum of an offset value variable with throttle position plus said default value (ESMIN=ESDEFAULT+offset).

24. A control system for controlling automatic upshifting in a vehicular automated mechanical transmission system

(10) for a vehicle comprising a fuel-controlled engine (12), a multiple-speed mechanical transmission (14), and a controller (28) for receiving input signals (30) including one or more of signals indicative of throttle position (THL), engine speed (ES), engaged gear ratio (GR) and vehicle speed (OS), and to process said input signals in accordance with with logic rules to issue command output signals (32) to transmission system actuators including a transmission actuator (52) effective to shift said transmission, said control system including logic rules for establishing an upshift feasibility criteria whereby upshifts into a target gear ratio are considered feasible only if, under sensed vehicle operating conditions, substantial synchronization can be achieved above a predetermined engine speed (ESMIN), said control system characterized by said logic rules being effective, for (i) sensing throttle position (THL);

(ii) comparing throttle position to a performance reference value (REF);

(iii) if considering the feasibility of a single upshift or if throttle position is less than said performance reference value, causing said engine speed to equal a default value ($ES_{MIN}=ES_{DEFAULT}$); and (iv) if (a) considering the feasibility of skip upshifts and (b) throttle position exceeds said performance reference value, causing said engine speed to equal the sum of an offset value variable with throttle position plus a default value ($ES_{MIN}=ES_{DEFAULT}+offset$).

* * * * *